(12) United States Patent
March

(10) Patent No.: US 11,919,345 B2
(45) Date of Patent: Mar. 5, 2024

(54) AMPHIBIOUS VEHICLE

(71) Applicant: J. David March, Newport Coast, CA (US)

(72) Inventor: J. David March, Newport Coast, CA (US)

(*) Notice: Subject to any disclaimer, the term of this patent is extended or adjusted under 35 U.S.C. 154(b) by 89 days.

(21) Appl. No.: 17/751,143

(22) Filed: May 23, 2022

(65) Prior Publication Data
US 2023/0373258 A1 Nov. 23, 2023

(51) Int. Cl.
| | | |
|---|---|---|
| B60F 3/00 | (2006.01) | |
| B60K 17/344 | (2006.01) | |
| B63H 1/14 | (2006.01) | |
| B63H 23/34 | (2006.01) | |
| F16H 57/04 | (2010.01) | |

(52) U.S. Cl.
CPC .......... *B60F 3/0007* (2013.01); *B60F 3/0038* (2013.01); *B60K 17/344* (2013.01); *B63H 1/14* (2013.01); *B63H 23/34* (2013.01); *F16H 57/0415* (2013.01); *F16H 57/0457* (2013.01); *F16H 57/0495* (2013.01)

(58) Field of Classification Search
CPC ........ B60F 3/00; B60F 3/0007; B60F 3/0038; B60K 17/344; B63H 1/14; B63H 23/34; F16H 57/0415; F16H 57/0457; F16H 57/0495
See application file for complete search history.

(56) References Cited

U.S. PATENT DOCUMENTS

| | | |
|---|---|---|
| 3,421,472 A | 1/1969 | Oberg |
| 3,903,831 A | 9/1975 | Barlett |
| 4,241,686 A | 12/1980 | Westphalen |
| 4,958,584 A | 9/1990 | Williamson |
| 5,632,221 A | 5/1997 | Trenne |
| 6,808,430 B1 | 10/2004 | March |
| 6,921,304 B2 | 1/2005 | Hewitt |
| 7,004,801 B2 | 2/2006 | Bryham |
| 7,950,973 B2 | 5/2011 | Hewitt |
| 8,002,596 B2 | 8/2011 | Wernicke |
| 8,221,174 B2 | 7/2012 | March |
| 8,764,499 B1 | 7/2014 | March |
| 8,808,042 B1 | 8/2014 | Hewitt |
| 9,022,822 B2 | 1/2015 | Hewitt |

(Continued)

FOREIGN PATENT DOCUMENTS

| | | |
|---|---|---|
| WO | WO2008023191 | 2/2008 |
| WO | WO2012051334 | 12/2012 |

*Primary Examiner* — Stephen P Avila
(74) *Attorney, Agent, or Firm* — Averill, Green & Kim; Philip Y Kim; Kenneth L. Green

(57) ABSTRACT

An Amphibious Vehicle (AV) is capable of planing with less power than prior similar size amphibious vehicles and using mostly off-the-shelf part. The AV uses an outdrive and propellor instead of a pump, and also include leading rear wheel well flaps which are spring biased forward against the hull bottom for on-road use, and pivot back to fill a gap between the hull and rear tire, reducing drag during in-water use. The combination of the propellor and wheel well flap allows planing with less horse power. An engine faces to the rear and either reversing differentials to reversing carrier and hubs provide correct wheel rotation. A reversing gear box attaches to an engine front and reverses rotation providing correct rotation for an outdrive and propellor.

16 Claims, 9 Drawing Sheets

(56) References Cited

U.S. PATENT DOCUMENTS

| | | |
|---|---|---|
| 9,102,389 B2 | 8/2015 | King |
| 9,315,086 B2 | 2/2016 | Muller |
| 9,352,626 B1 | 5/2016 | Bruening |
| 9,649,901 B2 | 5/2017 | Bachmann et al. |
| 9,956,837 B2 | 5/2018 | Gibbs |
| 10,773,563 B1 | 9/2020 | Tsai |
| 2004/0014371 A1* | 1/2004 | Gibbs .................. B60F 3/0007 440/12.5 |
| 2004/0242090 A1* | 12/2004 | Gibbs ..................... B60K 5/02 440/12.5 |

* cited by examiner

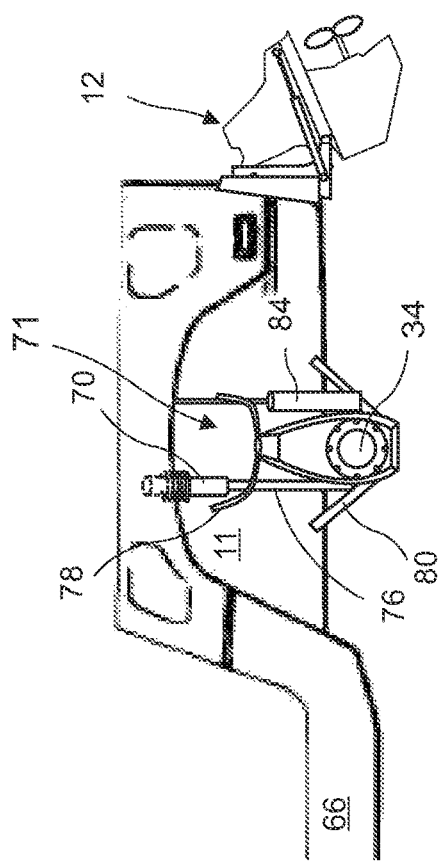
FIG. 7A
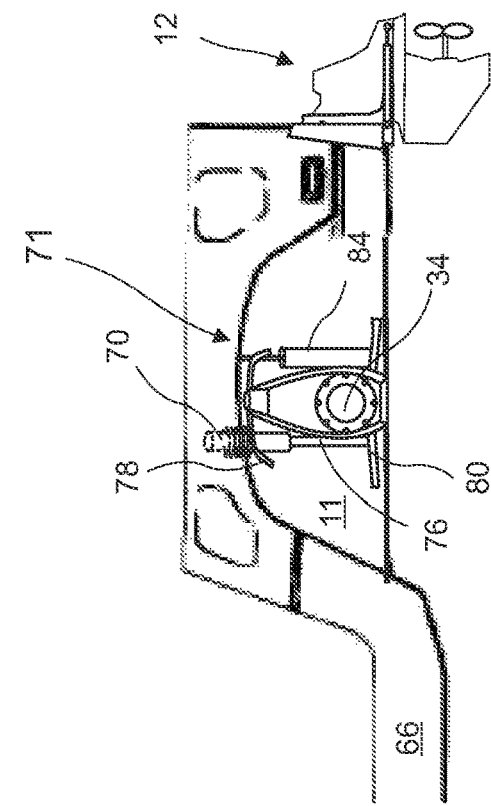
FIG. 7B
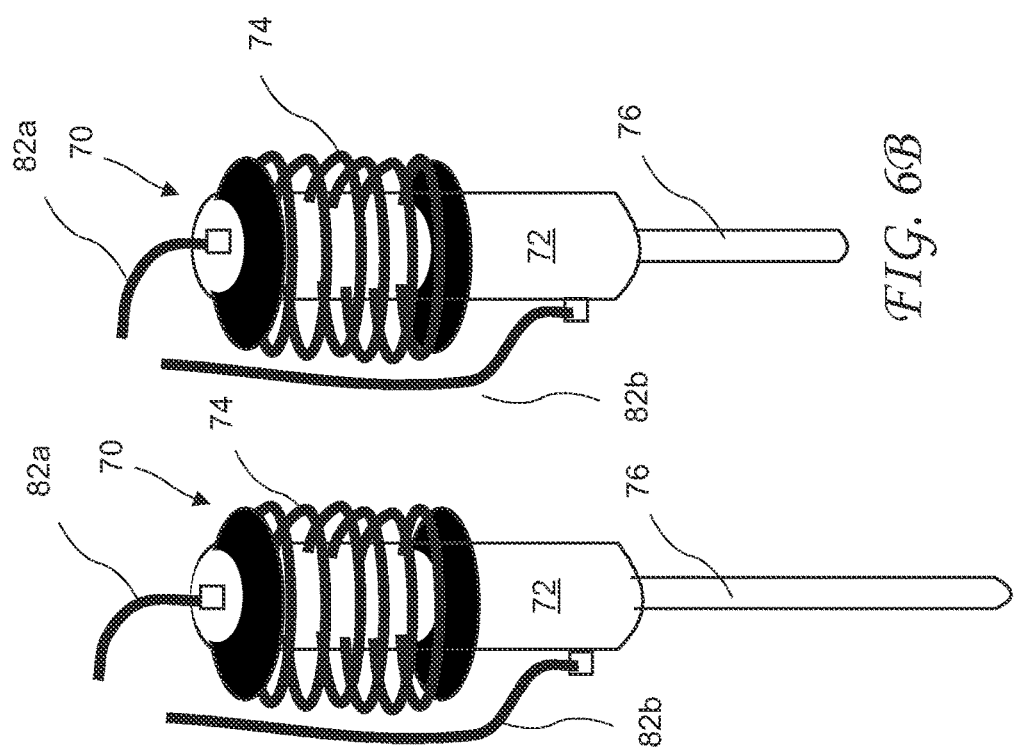
FIG. 6B
FIG. 6A

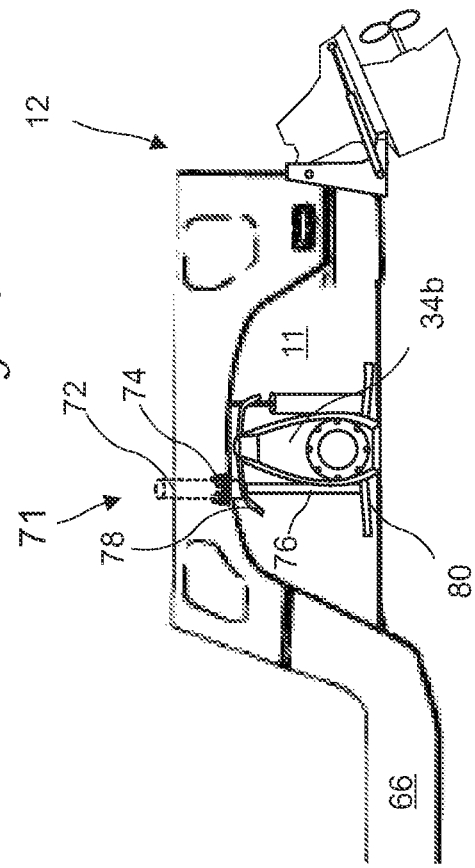
FIG. 9A
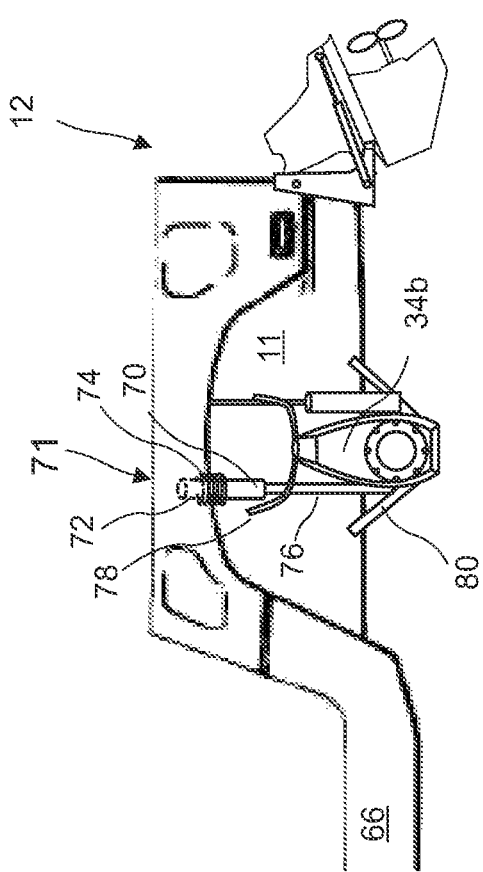
FIG. 9B
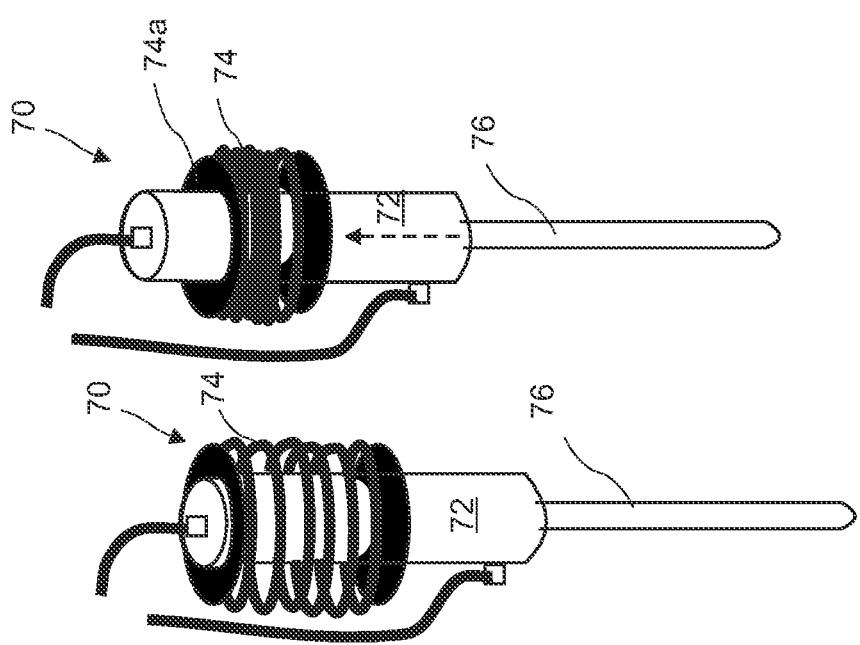
FIG. 8A
FIG. 8B

AMPHIBIOUS VEHICLE

BACKGROUND OF THE INVENTION

The present invention relates to Amphibious Vehicles (AVs) and to an AV capable of planing.

A wide variety of AVs have been introduced in recent years. Most of these vehicles are low speed, but at least two manufactures, Gibbs Amphibians and WaterCar, have developed higher speed AVs. One requirement to reach a high speed is that the vehicle is capable of planing. Planing is present when a vehicle is supported by hydrodynamic lift which results in less drag. Planing removes some of the limitations of hull speed.

However, to achieve planing, a high power to weight ratio is required. For such AVs, the power required often requires a high performance engine with resulting reliability, maintenance, and repair issues. Further, there is a world wide market for high speed AVs and in order to be successful in a global market place, the AVs must be globally maintainable. Unfortunately, known AVs capable of high speed and required a number of custom, not off-the-shelf parts, and such parts are not readily available in many locations. For example, known high speed amphibious vehicles have required a custom transaxle or transfer case coupling an engine to wheels for on-land operation, and to a jet pump for in-water operation, such transaxle is disclosed in U.S. Pat. No. 6,808,430 to present Applicant.

As a result, a need remains for AVs capable of planing without greater power and using mainly off-the-shelf parts.

BRIEF SUMMARY OF THE INVENTION

The present invention addresses the above and other needs by providing Amphibious Vehicles (AVs) capable of planing with less power than prior similar size amphibious vehicles and using mostly off-the-shelf part. The AVs use an outdrive and propellor instead of a pump, and also include leading rear wheel well flaps which are spring biased forward against the hull bottom for on-road use, and pivot back to fill a gap between the hull and rear tire, reducing drag, by a flow of water under the AV for in-water use. The combination of the propellor and wheel well flap allows planing with less horse power. An engine faces to the rear and either reversing differentials to reversing hubs provide correct wheel rotation. A reversing gear box attaches to an engine front and reverses rotation providing correct rotation for the outdrive and propellor.

In accordance with one aspect of the invention, there is provided an AV with a rear facing engine and an outdrive with propellor. The outdrive may be trimmed which changes the thrust angle of the prop to help lift the boat on plane from a start and then to raise the bow at speed to achieve a smooth ride and reduce drag, improving top speed and efficiency. The outdrive is driven off the front of the engine which results in reversing the rotation the outdrive is designed for, and the propellor cannot merely be reversed to provide propulsion because internal outdrive components require clockwise rotation. The outdrive is coupled to the engine through a reversing, in/out box to provide proper rotation to the outdrive. Because the engine is rear facing, the rotation is reversed between the engine and wheel, either by reversing differentials, or reversing hubs at each wheel.

In accordance with another aspect of the invention, there is provided an AV 10 with a flap biased forward against a hull bottom of the AV by a spring, and pivoting to cover a gap between the hull bottom and retracted rear tires by a flow of water under the AV. Filling the gap reduces drag.

In accordance with another aspect of the invention, there is provided an AV with flexible boots preventing or limiting water entering the AV interior through axle openings. The flexible boots are attached to wheel well inner walls around the axle openings, and taper down to a bearing riding on the axle. A leather boot is particularly suitable for exposure to salt water.

In accordance with still another aspect of the invention, there is provided an AV with wheel lifts including suspension springs above a cylinder. The spring provides suspension travel for on-land operation.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 6A shows a wheel retracting element extended of the AV, according to the present invention.

FIG. 6B shows the wheel retracting element retracted of the AV, according to the present invention.

FIG. 7A shows the wheel retracting element extended and lowering a hub of the AV for on-land use, according to the present invention.

FIG. 7B shows the wheel retracting element retracted and lifting the hub of the AV for in-water use, according to the present invention.

FIG. 8A shows an extended wheel retracting element for on-land use, according to the present invention.

FIG. 8B shows a spring the retracting element compressed by suspension travel during the on-land use, according to the present invention.

FIG. 9A shows an extended wheel retracting element, according to the present invention.

FIG. 9B shows a extended wheel retracting element with the spring compressed by suspension travel during the on-land use, according to the present invention.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. Where wheels are referred to, the element generally is a tire mounted to a wheel. An engine rear is an end of an engine a transmission is normally attached to. An engine front is an end of the engine opposite to the engine rear. Reversing refers to reversing a rotation from a typical vehicle to compensate for the engine facing to the rear of the vehicle.

Figure 1:
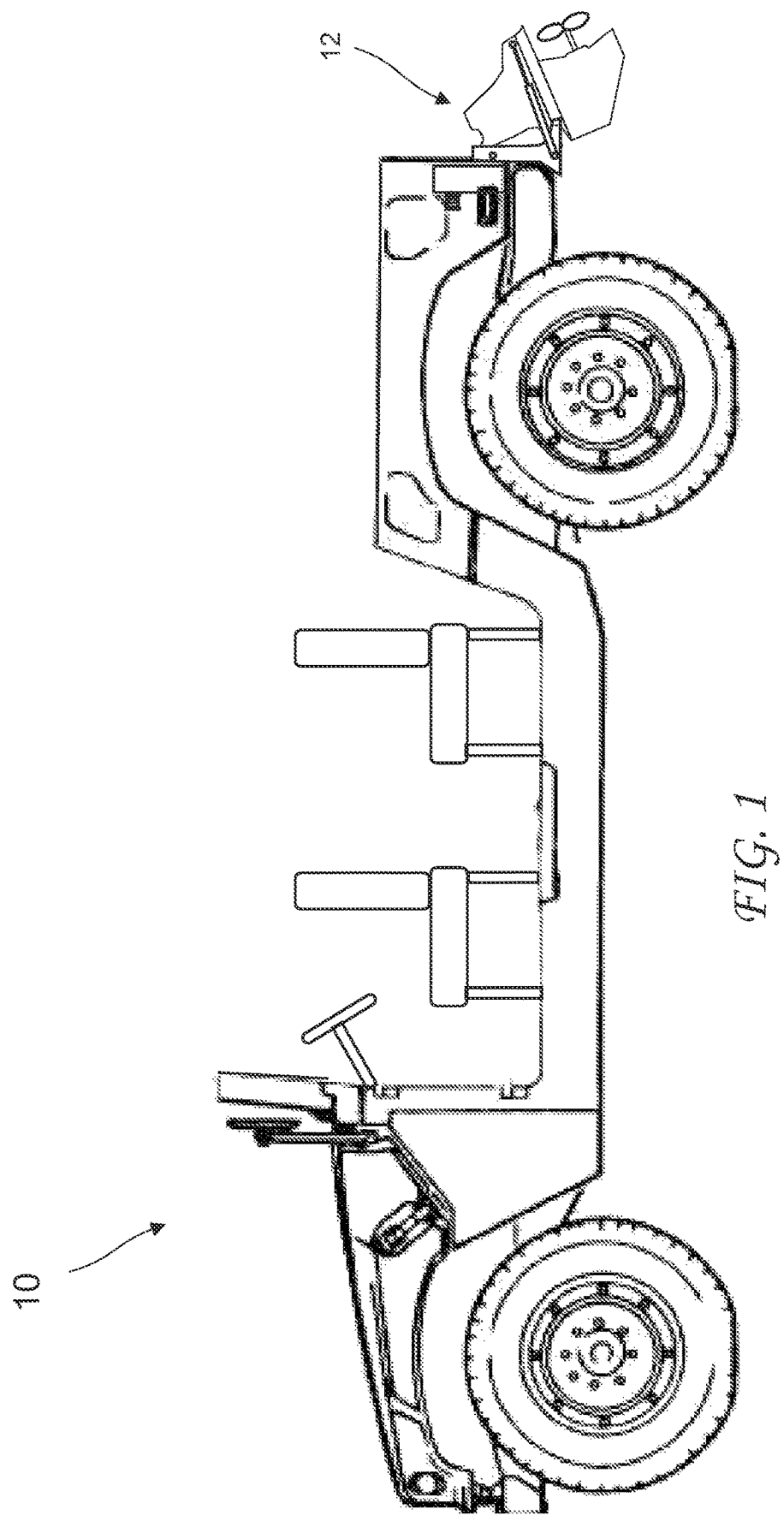
FIG. 1 shows an Amphibious Vehicle (AV) according to the present invention.

An Amphibious Vehicle (AV) 10 according to the present invention is shown in FIG. 1. The AV 10 includes and outdrive 12 for in-water operation.

Figure 2A:
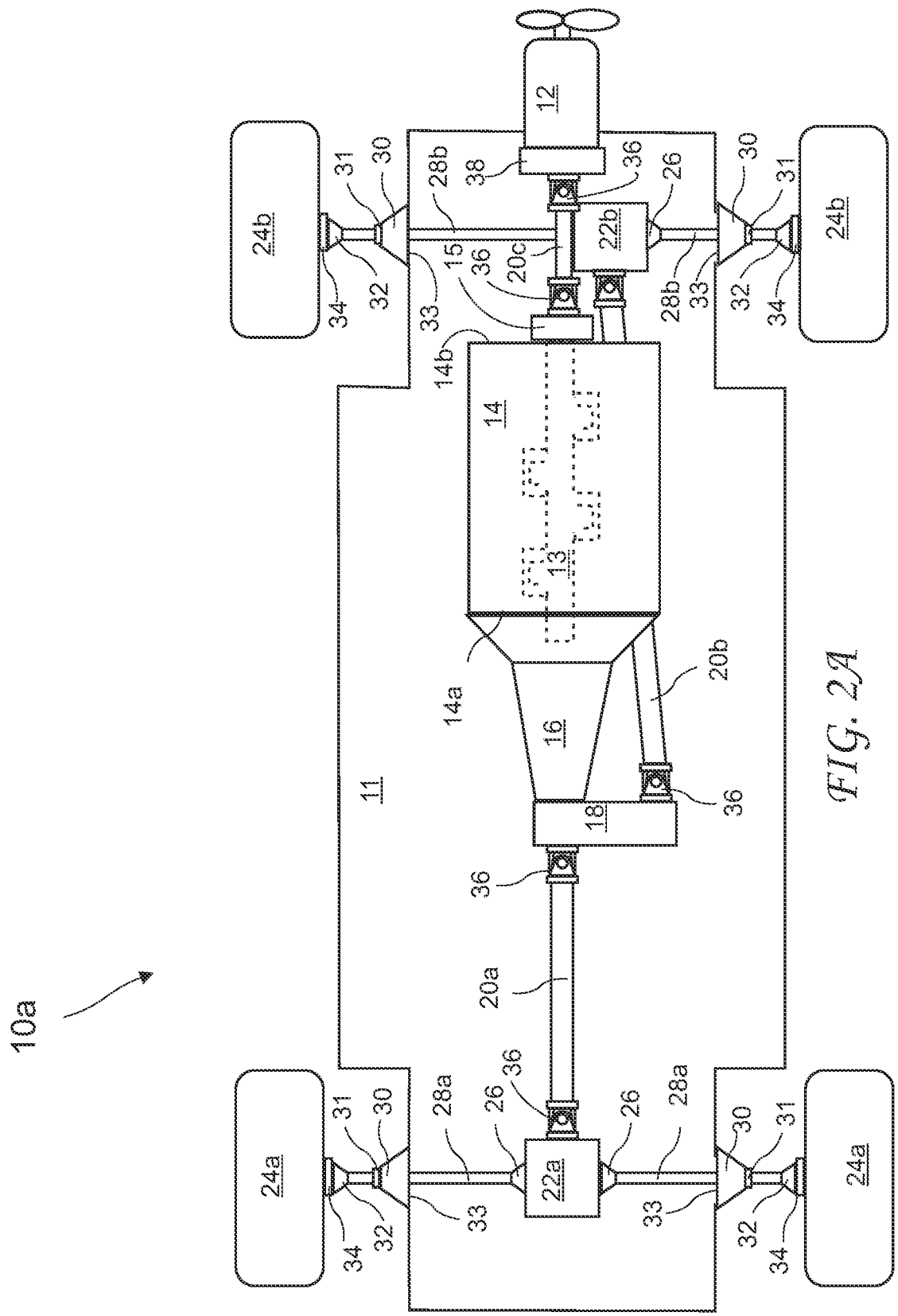
FIG. 2A shows a drive train of the AV including reversing differentials according to the present invention.

A drive train of an AV 10a including reversing gears comprising reversing differentials 22a and 22b is shown in FIG. 2A. The AV 10b includes an engine rear 14a of an engine 14 coupled to a transmission 16 for on land operation. The transmission 16 preferably drives a transfer case 18 coupled to a front, reversing differential 22a by front drive shaft 20a, and coupled to a rear reversing differential 22b by rear drive shaft 20b. The drive shafts 20a and 20b include U-joints, or Constant Velocity (CV) joints 36, preferably at both ends of the front drive shaft 20a and rear drive shaft 20b. The front differential 22a is connected to front wheels 24a by front axles 28a through inner axle U-joints or CV joints 26 and outer axle U-joints or CV joints 32 and hubs 34. Boots 30 are fixed over chassis 11 axle openings 33 on an inner end of the boots 30 and ride on sealing bearing 31 on the axles 28a and 28b (see FIGS. 10 and 11) at an outer end of the boots 30. The boots 30 prevent or limit water entering the AV 10 through the axle openings 33.

The rear differential 22b is connected to rear wheels 24b by axles 28b through inner axle U-joints or CV joints 26 and outer axle U-joints or CV joints 32 and hubs 34. Boots 30 are fixed to axle openings 33 on an interior end and ride on the sealing bearing 31 at an outer end. The boots 30 prevent or limit water entering the AV 10b through the axle openings 33. The reversing differentials 22a and 22b reverse rotation to provide correct forward motion then the rear of the engine 14 faces forward, opposite to the typical engine direction.

Figure 2B:
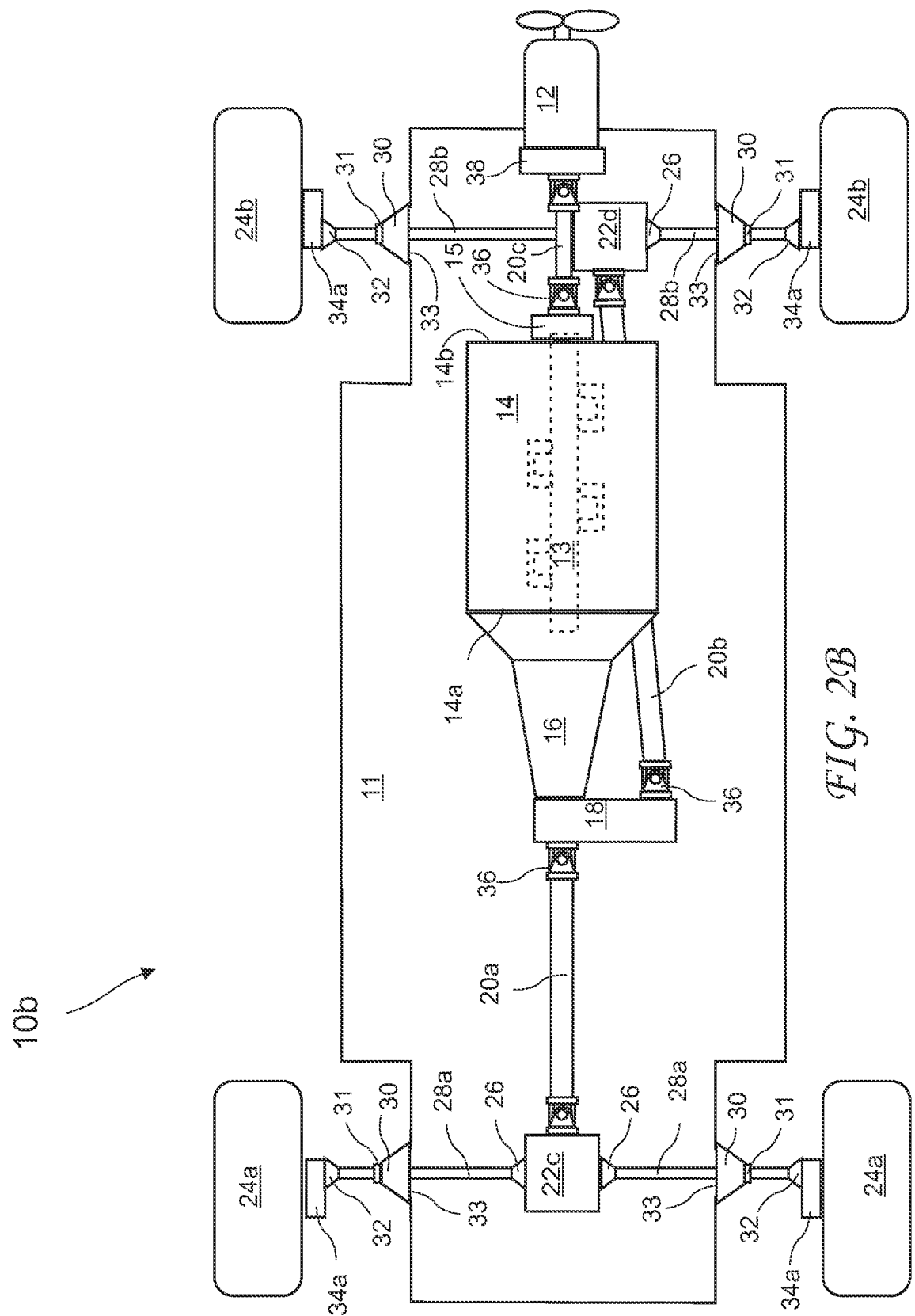
FIG. 2B shows a drive train of the AV including reversing gear hubs according to the present invention.

A drive train of an AV 10b including reversing gears comprising reversing carrier and hubs 34a is shown in FIG. 2B. The AV 10b includes the engine rear 14a of the engine 14 coupled to the transmission 16 for on-land operation. The transmission drives the transfer case 18 couples to front and rear differentials 22c and 22d by the front drive shaft 20a and the rear drive shaft 20b through the U-joints 36, preferably at both ends of the front drive shaft 20a and rear drive shaft 20b. The front differential 22c is connected to reversing carrier and hubs 34a by axles 28a through inner axle U-joints or CV joints 26 and outer axle U-joints or CV joints 32. The reversing carrier and hubs 34a drive the front wheels 24a. Boots 30 prevent or limit water entering the AV 10b through the axle openings 33. The boots 30 are fixed to axle openings 33 on an interior end of the boots 30 and ride on the sealing bearing 31 at an outer end.

The rear differential 22d is connected to the reversing carrier and hubs 34a by axles 28b through the inner axle U-joints or CV joints 26 and outer axle U-joints or CV joints 32. The reversing carrier and hubs 34a drive the rear wheels 24b. Boots 30 prevent or limit water entering the AV 10 through the axle openings 33. The boots 30 are fixed to cover axle openings 33 on an interior end and ride on sealing bearing 31 at an outer end. The reversing carrier and hubs 34a reverse rotation to provide correct forward motion then the engine front 14b of the engine 14 faces to the rear of the AV 10b opposite to normal direction.

A harmonic damper 15, or similar coupling, attached to an engine crankshaft 13 at an engine front 14b of the engine 14, is coupled to a gear box 38 through a drive shaft 20c. The drive shaft 20c preferably includes u-joints or CV joints 36 at both ends. The gear box 38 is connected to the outdrive 12 for in-water use.

The engine 14 is reversed from normal use. Such reversing reverses transmission input shaft rotation. The reversing differentials 22a and 22b, or the reversing carrier and hubs 34, reverse rotation, thus provide normal motion of the AV 10a or AV 10b.

Figure 3B:
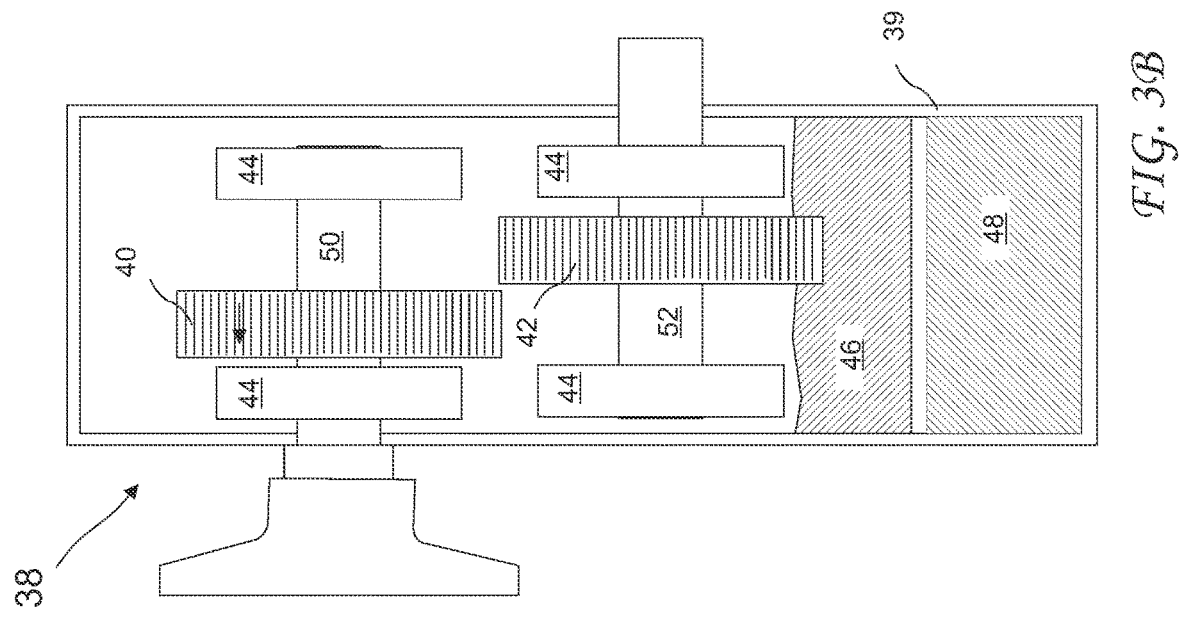
FIG. 3B shows a disengaged gear box of the AV according to the present invention.
Figure 3A:
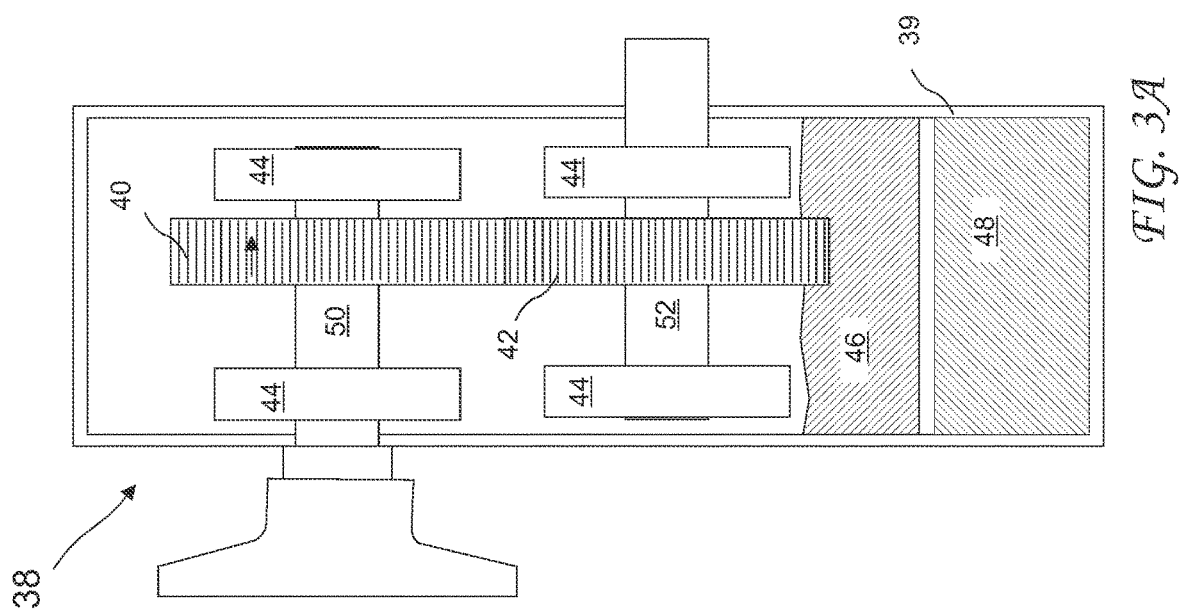
FIG. 3A shows an engaged gear box of the AV according to the present invention.

An engaged gear box 38 of the AV 10 is shown in FIG. 3A and a disengaged gear box 38 is shown in FIG. 3B. The gear box 38 includes and input shaft 50 riding on bearings 44 and rotationally coupled to drive gear 40. The gear box 38 also includes and output shaft 52 riding on bearings 44 and rotationally coupled to driven gear 42. The drive gear 40 moves rearward to engage the driven gear 42, and forward to disengage from the driven gear 42. The bearing 44 are preferably sealed bearing not requiring lubricant. The drive gear 40 spins whenever the engine 14 is running, but only requires lubrication when engaged with the driven gear 42. The driven gear 42 is at least partially immersed in lubricant 46, and lubricates the engagement of the gears 40 and 42. Coolant 48 may circulate through the gear box 38 housing 39, but separated from the interior and lubricating oil 46. In other embodiments, the drive gear may be below the driven gear and the drive gear may be at least partially immersed in the lubricating oil 46.

Figure 4B:
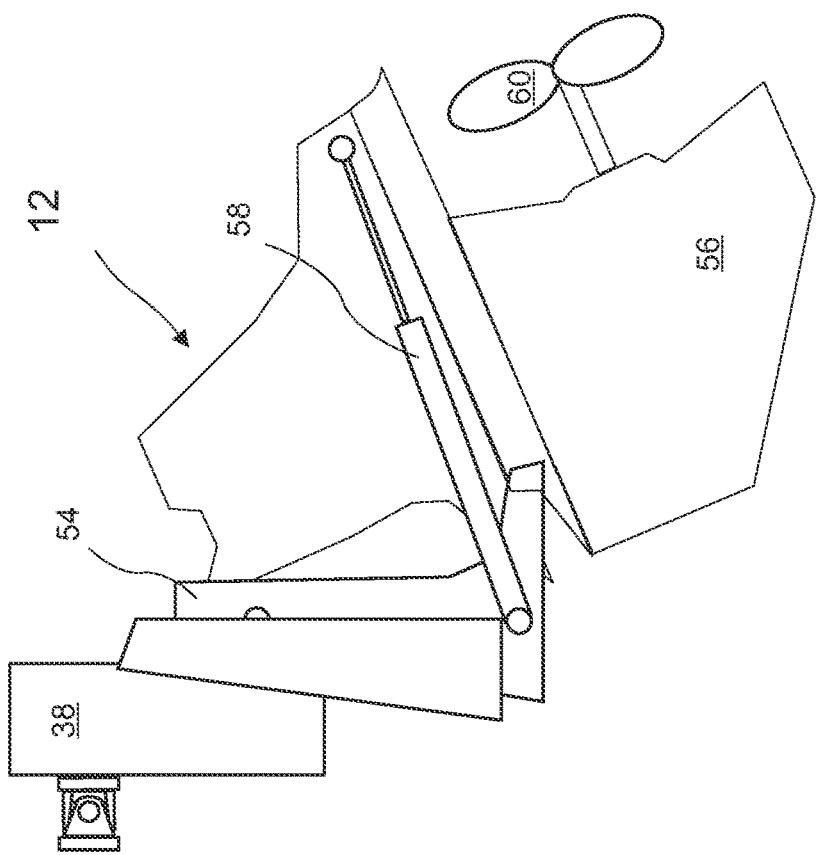
FIG. 4B shows the outdrive positioned for on-land operation of the AV according to the present invention.
Figure 4A:
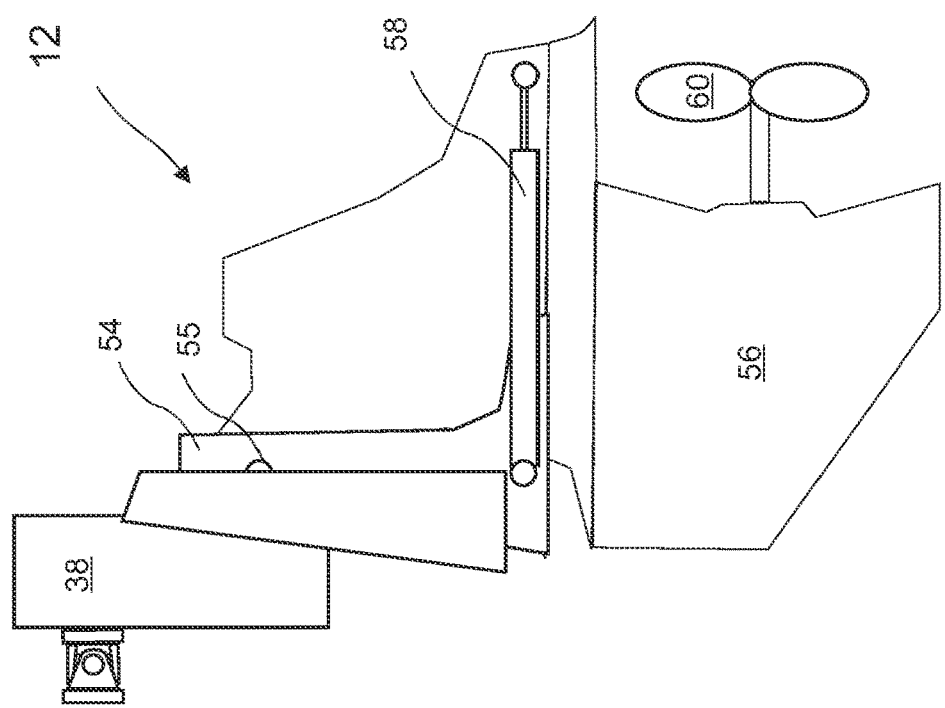
FIG. 4A shows an outdrive positioned for in-water operation of the AV according to the present invention.

The outdrive 12 positioned for in-water operation of the AV 10 is shown in FIG. 4A and the outdrive 12 positioned for on-land operation of the AV 10 is shown in FIG. 4B. A gimbal assembly 54 of the outdrive 12 is fixed to the chassis 11 (see FIG. 2), and the outdrive 12 pivots about a bearing 55 of the gimbal assembly 54. Cylinders 58 connected between the gimbal assembly 54 and outdrive 12 pivot the outdrive up about a gimbal bearing 54 lifting a fin 56 and propellor 60 for the on-land operation. The gear box 38 is fixed to the gimbal assembly 54 and the output shaft 52 (see FIGS. 3A and 3B) drives the outdrive 12.

Figure 5A:
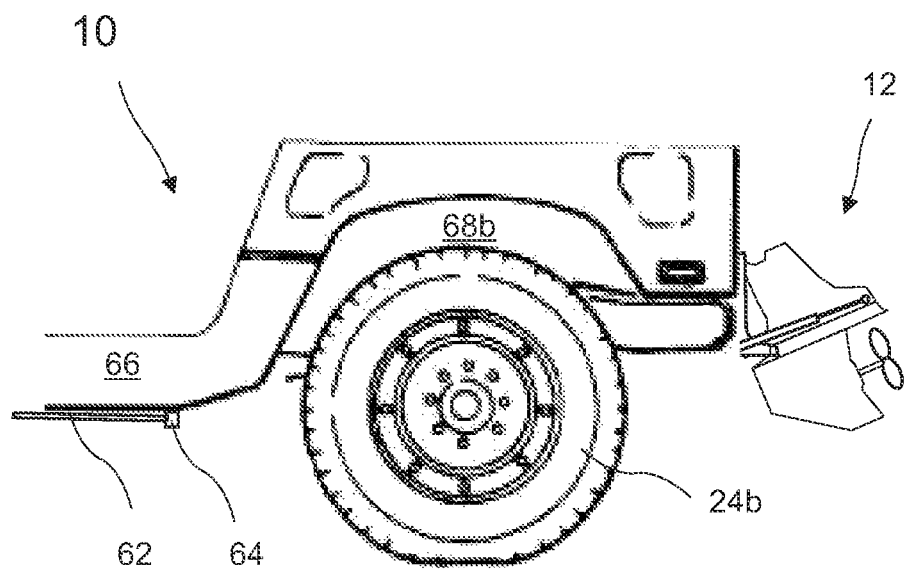
FIG. 5A shows a rear tire flap resting forward under the body of the AV according to the present invention.

A rear tire flap 62 is shown resting forward of the rear wheel well 68b on a body bottom 66a and under the body 66 of the AV 10 in FIG. 5A. The flap 62 is biased forward and up by a biasing element 64 during on-land operation. The biasing element 64 may be a spring and provides sufficient torque to retain the flap 62 against the bottom of the AV 10 in normal on-road driving conditions.

Figure 5B:
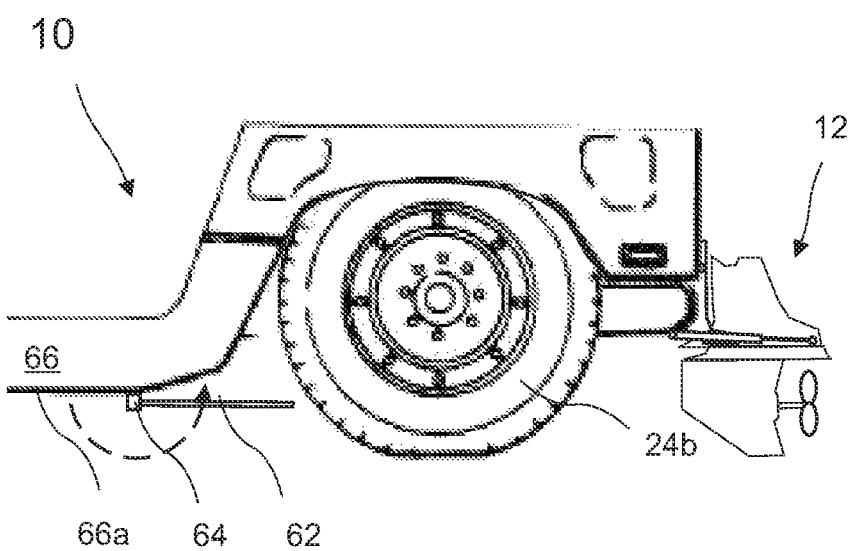
FIG. 5B shows the rear tire flap urged rearward under a rear wheel well opening of the AV according to the present invention.

The rear tire flap 62 is shown urged rearward under a rear wheel well opening 68b of the AV 10 in FIG. 5B. In this position the flap 62 provides a smooth flow of water under the AV 10 to reduce drag. The flap 62 is rotated back only by a flow of water, not by other forces or torque to overcome the biasing element 64.

A wheel retracting element 70 of the AV 10 is shown extended in FIG. 6A for on-land use, and the wheel retracting element 70 retracted is shown in FIG. 6B for in-water use. The wheel retracting element 70 includes a spring 74 for on-land suspension travel. A cylinder 72 raises and lowers a rod 76 to raise and lower the carrier and hubs 34, while the cylinder 72 and spring 74 remain fixed absent suspension travel. Hydraulic hoses 82*a* and 82*b* carry flows of hydraulic fluid to and from the cylinder 72 to raise and lower the rod 76.

Rear suspension 71 including the rear carrier and hubs 34 is shown connected to the chassis 11 by upper control arms 78 and lower control arms 80 in FIG. 7A. The extended wheel retracting element 70 is shown connecting the lower control arm 78 to the chassis 11 with the rod 76 extended for on-land use. Shock absorbers 84 parallel with the retracting elements 70 dampen motion of the control arms.

The rod 76 is show retracted into the cylinder 72 lifting carrier and hubs 34, for in-water use in FIG. 7B.

The retracting elements 70 is shown extended in FIG. 8A during on-land driving and is shown with the spring 74 compressed allowing suspension travel during on-land use in FIG. 8B. The top 74*a* of the spring 74 is prevented from vertical motion and the cylinder 72 and rod 76 move vertically together compressing and relaxing the spring 74 providing suspension travel of the carrier and hub 34 during on-land use.

The retracting element 70 is shown with the spring 74 extended in FIG. 9A during on-land use, and the retracting element 70 is shown with the spring 74 compressed and the cylinder 72 and rod 76 lifted by suspension travel during on-land use in FIG. 9B.

Front suspension preferably includes the same arrangement of the carrier and hubs, control arms, retracting elements, and shock absorbers as the rear suspension 71.

Figure 10:
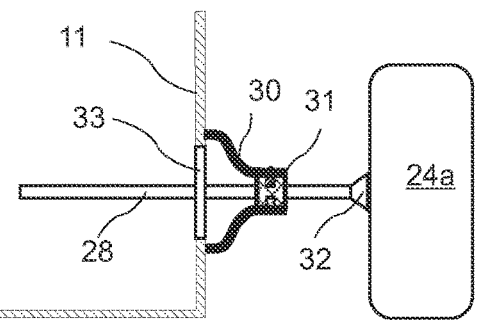
FIG. 10 shows a boot sealing a boot opening in the AV, according to the present invention.
Figure 11:
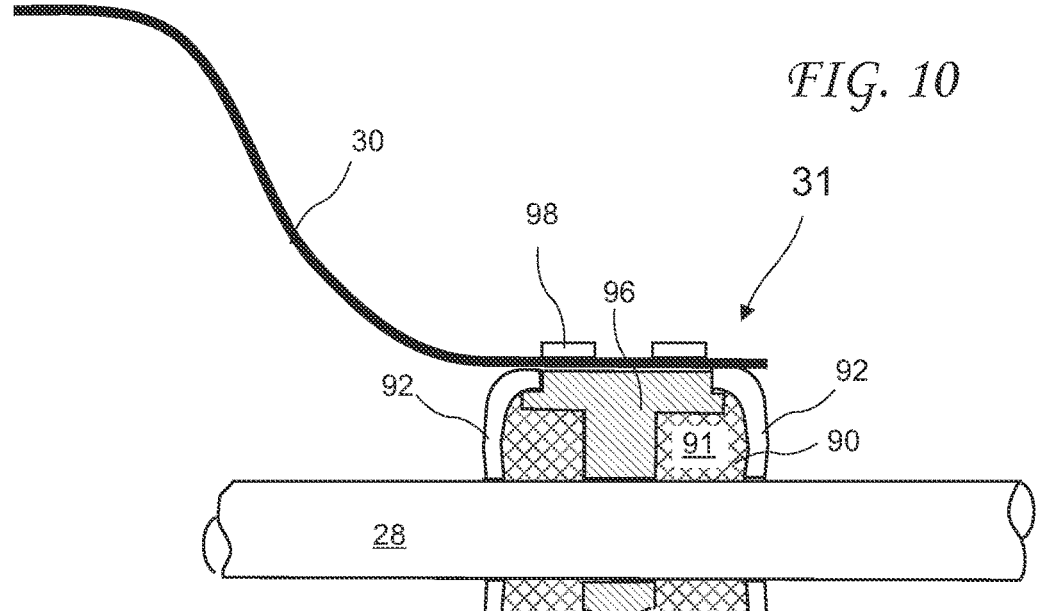
FIG. 11 shows a boot seal riding on an axle of the AV, according to the present invention.

The boot 30 sealing the boot opening 33 in the AV 10 chassis 11 is shown in FIG. 10 and the boot seal 31 riding on the axle 28 of the AV 10 is shown in FIG. 11. The boot seal 31 includes a center 96 and axle seals 92 attached to opposite ends of the center 96. The center 96 rides on the axle 28 and the axle seals 92 reach axially into the axle 28 forming a cavity 90 between the center 96, the axle seals 92, and the axle 28. The cavity 90 is filled or partially filled with grease 91. A zerk fitting 94 allows grease to be pumped into the cavity 90. Clamps 98 hold the boot to the boot seal 31. The clamps 52 may be hose clamps.

While the invention herein disclosed has been described by means of specific embodiments and applications thereof, numerous modifications and variations could be made thereto by those skilled in the art without departing from the scope of the invention set forth in the claims.

I claim:

1. An Amphibius Vehicle (AV), comprising:
a chassis;
wheels for on-road use;
an engine carried by the chassis;
an engine rear facing forward;
an engine front facing rearward;
a rotating engine crankshaft residing inside the engine;
a transmission rotationally coupled to the engine crankshaft at the engine rear;
reversing gears rotationally coupling the wheels to the transmission for on-road use, the reversing gears reversing rotation of the wheels;
a reversing gear box rotationally coupled to the engine crankshaft at the engine front, the reversing gear box reversing rotation; and
an outdrive and propeller rotationally coupled to the reversing gear box, the reversing gear box reversing rotation of the outdrive and propeller to rotation of the crankshaft.

2. The AV of claim 1, wherein the reversing gear box is driven off a harmonic damper attached to the engine crankshaft at the engine front.

3. The AV of claim 1, wherein the reversing gear box includes:
a drive gear rotationally fixed to an input shaft rotate with engine crankshaft; and
a driven gear engaging the drive gear and rotationally fixed to an output shaft to rotate with the outdrive and propeller.

4. The AV of claim 3, wherein the drive gear is axially movable on the input shaft to engage and disengage from the driven gear.

5. The AV of claim 4, wherein:
the reversing gear box contains lubricating oil; and
the drive gear of the driven gear resides at least partially immersed in the lubricating oil.

6. The AV of claim 5, wherein the input shaft and the output shaft are carried on self lubricated bearings, the self lubricated bearings not requiring external lubricant.

7. The AV of claim 6, wherein coolant is circulated through a housing of the reversing gear box.

8. The AV of claim 1, wherein:
the reversing gearbox is connected to the engine by an outdrive drive shaft; and
reversing gear box universal joints connect the engine to the outdrive drive shaft and the outdrive drive shaft to the reversing gear box.

9. The AV of claim 1, wherein:
an outdrive gimbal assembly is fixed to the chassis of the AV;
the outdrive pivots about gimbal bearings of the outdrive gimbal assembly; and
the reversing gear box is fixed to the outdrive gimbal assembly.

10. The AV of claim 1, wherein:
the transmission drives both front and rear wheels through a transfer case;
the transfer case drives front and rear differential through transfer case drive shafts; and
the front and rear differentials drive the both front and rear wheels through front and rear half shafts.

11. The AV of claim 1, wherein:
the wheels are driven by half shafts reaching out from the chassis through boot openings;
boots are attached to the AV covering the boot openings at first ends; and
boot seals ride on the half shaft at second ends opposite to the first ends.

12. The AV of claim 11, wherein the boot seals comprise:
a center riding on the axle;
axle seals attached to inner and outer ends of the center;
cavities formed between the axle seals and the center; and
grease residing in the cavities.

13. The AV of claim 1, wherein:
horizontal flaps are pivotally attached to biasing devices on a body bottom of the AV;
the biasing devices bias the horizontal flaps forward and against the body bottom;
motion of the AV during in-water operation pivots the horizontal flaps to fill a gap ahead of each of the wheels.

14. The AV of claim 1, wherein:

the carrier and hubs are carried by upper and lower control arms;

wheel retractors connect between one of the upper and lower control arms and the chassis;

the wheel retractors include a cylinder and a bottom portion extendable and retractable from the cylinder to raise the wheels for in-water operation and lower the wheels for on-land operation; and a spring residing over the cylinder urging the cylinder down.

15. An Amphibius Vehicle (AV), comprising:

a chassis;

wheels for on-road use;

an engine carried by the chassis;

an engine rear facing forward;

an engine front facing rearward;

a rotating engine crankshaft residing inside the engine;

a transmission rotationally coupled to the engine crankshaft at the engine rear;

reversing differentials rotationally coupling the wheels to the transmission for on-road use, the reversing differentials reversing rotation of the wheels;

a reversing gear box rotationally driven off the engine crankshaft at the engine front, the reversing gear box reversing rotation;

an outdrive and propeller rotationally coupled to the reversing gear box, the reversing gear box reversing rotation of the outdrive and propeller to rotation of the crankshaft;

an outdrive gimbal assembly fixed to the chassis of the AV;

the outdrive pivots about gimbal bearings of the outdrive gimbal assembly; and the reversing gear box is fixed to the outdrive gimbal assembly.

16. An Amphibius Vehicle (AV), comprising:

a chassis;

front and rear wheels for on-road use;

an engine carried by the chassis;

an engine rear facing forward;

an engine front facing rearward;

a rotating engine crankshaft residing inside the engine;

a transmission rotationally coupled to the engine crankshaft at the engine rear, the transmission drives both the front and rear wheels through a transfer case;

the transfer case drives front and rear reversing differential through transfer case drive shafts; and the front and rear reversing differentials drive the both front and rear wheels through front and rear half shafts, the front and rear reversing differentials reversing rotation of the front and rear wheels to compensate for the engine rear facing forward;

a reversing gear box rotationally driven off the engine crankshaft at the engine front, the reversing gear box reversing rotation; and an outdrive and propeller rotationally coupled to the reversing gear box, the reversing gear box reversing rotation of the outdrive and propeller to rotation of the crankshaft.

\* \* \* \* \*